United States Patent [19]

Nozick et al.

[11] Patent Number: 4,689,493

[45] Date of Patent: Aug. 25, 1987

[54] CENTRALIZED SWITCHING CIRCUIT FOR BUILDING ELECTRICAL NETWORK

[76] Inventors: Jacques E. Nozick, 28 rue Broca, 75005 Paris; Patrick S. Lepaillier, 6 rue Garielle, 92140 Clamart, both of France

[21] Appl. No.: 824,809

[22] Filed: Jan. 31, 1986

[30] Foreign Application Priority Data

Feb. 8, 1985 [FR] France .................. 85 01800

[51] Int. Cl.⁴ .................. H02J 13/00; H02B 1/14
[52] U.S. Cl. .................. 307/147; 307/149; 361/339; 361/334
[58] Field of Search .............. 307/112, 147, 149, 150; 361/334, 332, 346–365; 178/69 A; 179/59, 70, 77, 98, 99, 99 LS, 174; 174/50, 50.52, 50.53, 59, 49; 200/297; 339/198 R, 198 J; 364/145, 505

[56] References Cited

U.S. PATENT DOCUMENTS

| | | | |
|---|---|---|---|
| 2,567,740 | 9/1951 | Smith | 361/334 X |
| 2,778,957 | 1/1957 | Fuchs | 361/334 X |
| 2,885,600 | 5/1959 | Wiseman | 361/334 |
| 3,688,262 | 8/1972 | Liquori | 340/825.37 |
| 3,774,234 | 11/1973 | Blair | 307/149 |
| 3,851,114 | 11/1974 | Bush et al. | 307/42 X |
| 4,090,230 | 5/1978 | Fuller et al. | 361/339 X |
| 4,178,624 | 12/1979 | Wilson et al. | 361/361 X |
| 4,194,181 | 3/1980 | Brundage | 340/310 A X |
| 4,243,890 | 1/1981 | Miller et al. | 361/390 X |
| 4,249,227 | 2/1981 | Kato et al. | 361/334 |
| 4,305,114 | 12/1981 | Takagi et al. | 361/339 X |
| 4,307,436 | 12/1981 | Eckart et al. | 361/334 X |
| 4,355,295 | 10/1982 | Kent | 339/198 R X |
| 4,504,885 | 3/1985 | Yoshikawa et al. | 361/342 |
| 4,507,526 | 3/1985 | Thoma | 361/357 X |
| 4,567,557 | 1/1986 | Burns | 340/310 A X |

Primary Examiner—William M. Shoop, Jr.
Assistant Examiner—Shik Luen Paul Ip
Attorney, Agent, or Firm—Sughrue, Mion, Zinn, Macpeak and Seas

[57] ABSTRACT

In a building electrical network including a power circuit constituted by several loops connected to sockets, lamps 35, 36, 37 and/or other electrically-operated apparatus, and a low-voltage circuit constituted by several loops connected to control means or sensors 38, 39, 40, 41 for controlling the loops of the power circuit, each loop of the low-voltage circuit and the corresponding loop of the power circuit are interconnected through a removable switching module 16 located in a centralized switching block 5. The low-voltage loops are not directly connected to terminals 12, 14 of the switching block, but are connected to terminals 45, 47 of a terminal strip 6, jumpers 46 establishing the connection between the terminals of the terminal strip(s) 6 and the terminals 12, 14 of the switching block 5. The plug-in switching modules 16 include an electronic relay member 21 (e.g. an optocoupler) and a power circuit switching component 23 which may perform various functions (remote ON/OFF, remote dimming, timing, etc.).

15 Claims, 4 Drawing Figures

Fig. 2

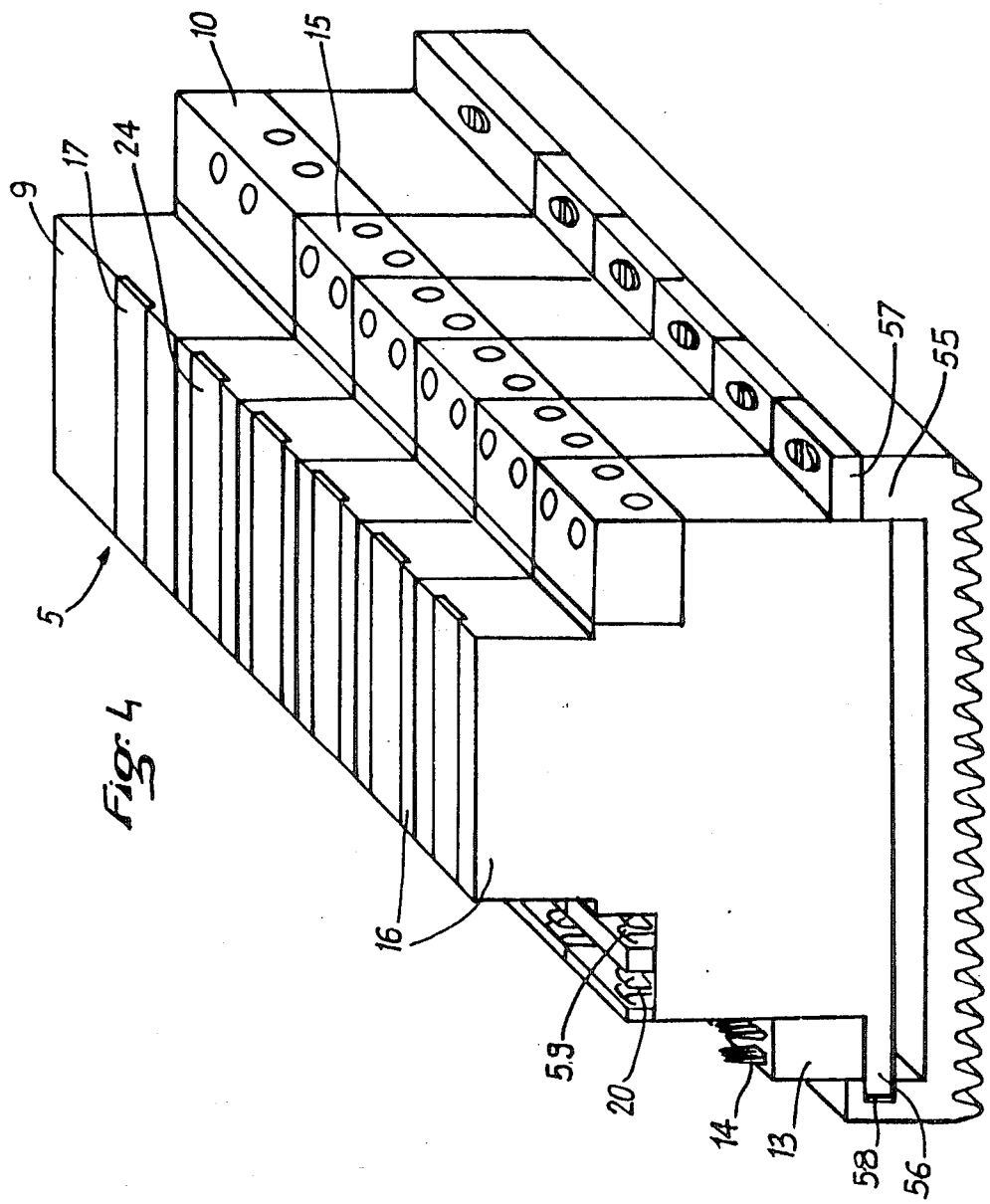

CENTRALIZED SWITCHING CIRCUIT FOR BUILDING ELECTRICAL NETWORK

BACKGROUND OF THE INVENTION

The present invention relates to a centralized switching circuit for the electrical network in a building.

At present the electrical networks installed in buildings, and in particular in residential buildings, include only one circuit connected to the mains, which circuit feeds various lamps and power outlets (wall sockets, etc.). The means provided for controlling the lamps (pushbuttons, switches, etc.) and optionally the means for controlling the power outlets are disposed in the same circuit which thus serves both as a control circuit and as a power circuit. This type of network in which a single circuit is used to perform two functions has the advantage of simplicity. However it also suffers from drawbacks. In particular, given that relatively high voltages are present (generally 220 volts in Europe), a conventional network must be wired in accordance with safety regulations which prohibit some paths to electric cables. In addition, having the control means placed in the controlled circuit itself makes it difficult to alter the location of the control means after the initial electrical wiring has been installed, even if the safety regulations could be ignored. Yet there are always some reasons of necessity or convenience which become manifest only after an installation has been installed. Further, controlling a single lamp by two or more control means gives rise to wiring problems. Finally, given that the power circuit and the control circuit are the same and given that the control means are located where they can easily be reached, they are rarely close to the lamps or the outlets which they control (e.g. lamps hanging from the middles of ceilings, or outlets situated along skirting boards close to the floor or even the ceiling), large quantities of relatively heavy gauge electric cable have to be used when wiring installations of this type, thereby increasing the expense.

One solution for remedying these defects consists in designing and installing electrical networks which are no longer constituted by a single circuit, but which are rather constituted by two circuits which circuits are interconnected by a centralized switching member.

SUMMARY OF THE INVENTION

The present invention provides a centralized switching circuit for the electrical network in a building, comprising a power circuit including at least one loop connected to a source of electricity, and to at least one lamp or other electrically-operated apparatus, and a low-voltage circuit for controlling the power circuit and comprising at least one loop connected to at least one control means or sensor.

The power circuit and low voltage circuit are interconnected by a centralized switching member, which is constituted by a switching block including at least two control circuit feeder terminals for connection to a control circuit loop, at least one inlet/outlet terminal for connection to a power circuit loop, and at least one switching module for establishing communication between a control circuit loop and a power circuit loop, the module being removable.

Suitable switching modules include a relay member which is advantageously optocoupled.

In one embodiment of the invention the control circuit comprises at least one connector strip having two series of terminals, the terminals of a first one of said series being interconnected, and the terminals of a second one of said series being independent, one end of each control loop being connected to one of the terminals in said first series and the other end of each control loop being connected to a terminal in said second series, said first series of terminals being connected to a first control circuit feed terminal, and each terminal in said second series which is connected to said other end of one of said control circuit loops being also connected to one end of a jumper whose other end is connected to a second control circuit feed terminal.

In another embodiment of the invention, the control circuit includes at least two terminal strips, one of said strips comprising a plurality of independent blocks of interconnected terminals, and the other of said strips comprising two series of terminals, the terminals of a first one of said series being interconnected and the terminals of a second one of said series being independent, one end of each control loop being connected to one of said terminals in said first series and the other end of each control loop being connected to one of said terminals in said second series, said first series of terminals being connected to a first control circuit feed terminal, and each of said second series terminals which is connected to one end of a control circuit loop being also connected to one end of a jumper whose other end is connected to one terminal of a block of said first-mentioned terminal strip, said block being connected to a second control circuit feed terminal by means of another jumper.

According to an optional feature of the invention, the terminal strips comprising two series of terminals as used in both embodiments described above by way of example, may constitute a mere interconnection point between the control circuit loops and the centralized switching circuit, however, they may alternatively include means for electronically processing the control signals.

BRIEF DESCRIPTION OF THE DRAWINGS

Embodiments of the invention are described by way of example with reference to the accompanying drawings, in which:

FIG. 2 is a diagrammatic front view of a distribution frame at which centralized switching of a power circuit takes place under the control of a low voltage control circuit in accordance with a second embodiment of a switching circuit in accordance with the invention;

FIG. 4 is a perspective view of one embodiment of a switching block in which the component parts are fixed to a radiator.

DETAILED DESCRIPTION OF THE PREFERRED EMBODIMENTS

Figure 1:
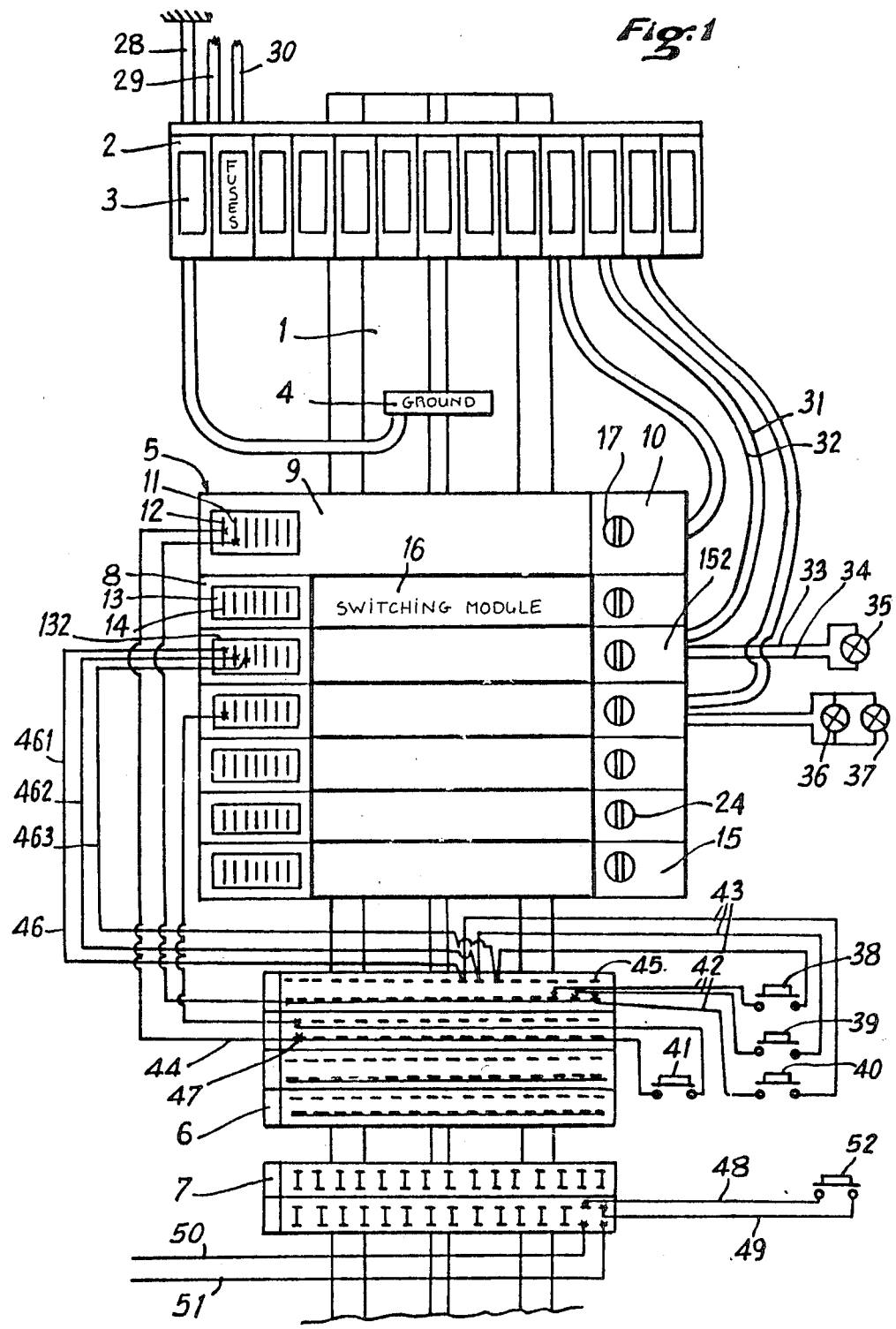
FIG. 1 is a diagrammatic front view of a distribution frame at which centralized switching of a power circuit takes place under the control of a low voltage control circuit in accordance with a first embodiment of a switching circuit in accordance with the invention.
Figure 2:
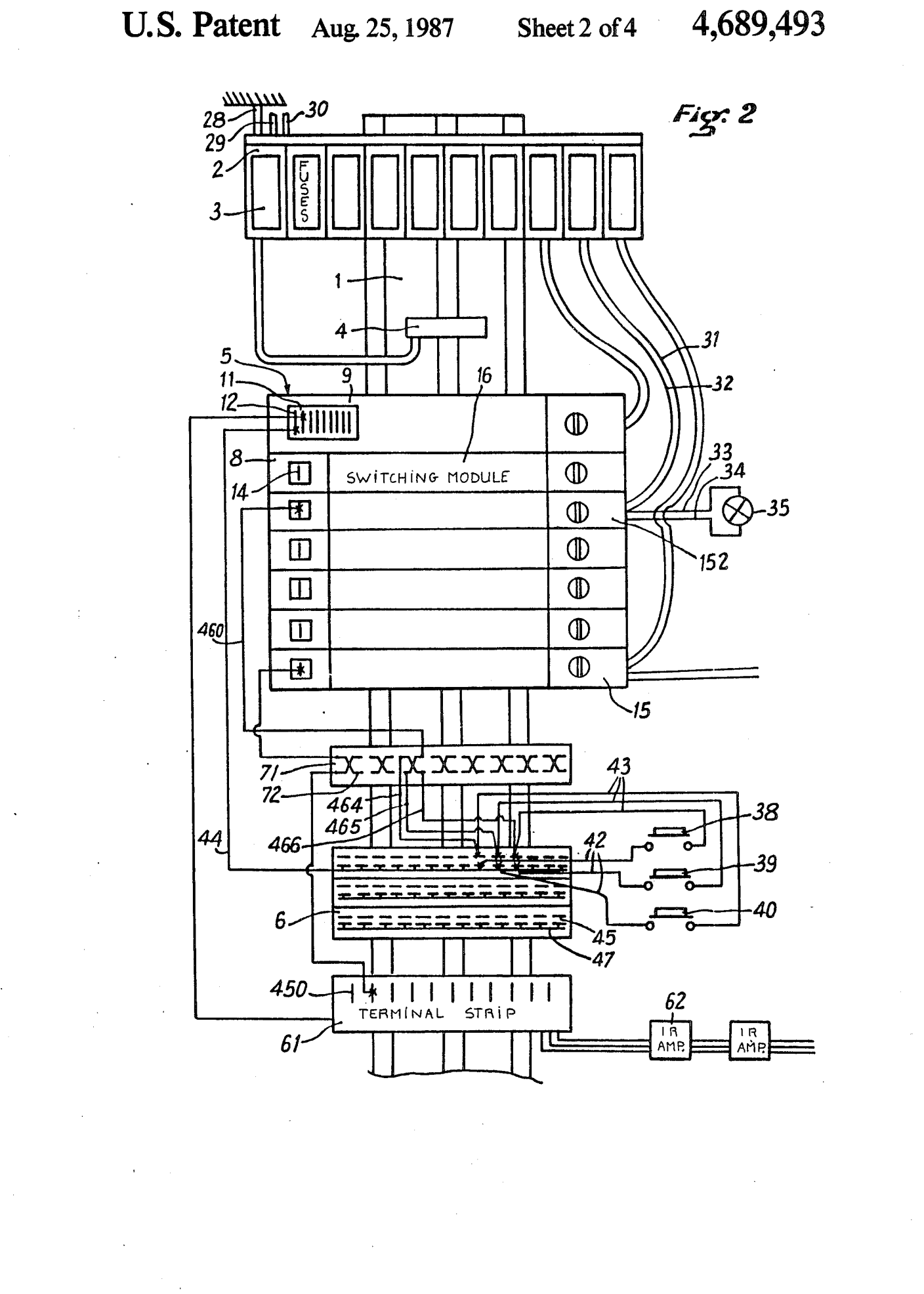

FIGS. 1 and 2 show two different embodiments of a centralized switching circuit enabling a power circuit to be switched at a distribution frame under the control of a corresponding low voltage control circuit. (Components which are common to both embodiments have the same reference numerals in both figures). The distribution frame comprises a grooved wall bar 1 to which the electrical components of the distribution frame are fixed, preferably by snap fastening. These components comprise a battery of feed terminals 2 which are protected by temperature protection components 3 (fuses, bimetallic strips, etc.), a set of ground terminals 4, a power switching block 5, terminal strips 6 and/or 61, one or more terminal strips 71 (for the FIG. 2 embodiment), and optional terminal strips 7.

Figure 3:
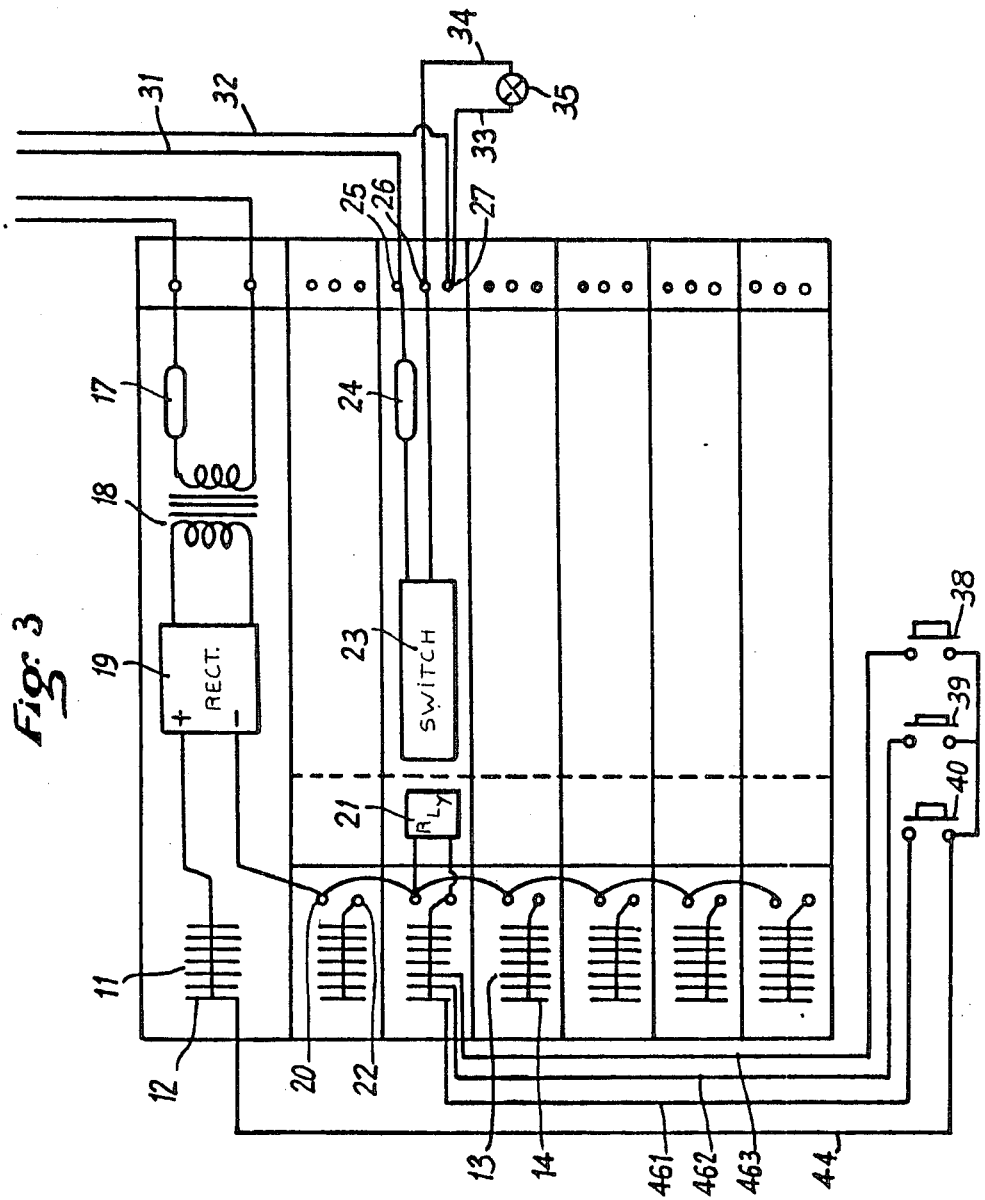
FIG. 3 is a simplified wiring diagram of a switching block including a switching module.

The power switching block 5 comprises a distribution panel 8 under a fixed box 9 which is fed by a terminal 10 and which contains the power supply circuits for feeding the low voltage control circuits. The panel 8 comprises a plurality of power inlet/outlet terminals 15 and a corresponding number of control terminal strips or blocks 13 having terminals 14 (in the FIG. 2 embodiment, these strips 13 of terminals 14 are each reduced to a single terminal 14). Between each terminal strip 13 and the corresponding power terminal 15, the panel 8 receives a removable power switching module 16 which is advantageously a plug-in module. In FIG. 3, it can be seen that the power supply for the control circuits includes a temperature protection component 17 (a fuse or equivalent), an isolating transformer 18 for providing low voltage power (at less than 24 volts) from the mains, and advantageously a rectifier 19 (a diode bridge or equivalent) for rectifying said low voltage. One of the terminals of this power supply (the + terminal in the circuit diagram) is connected to a terminal strip 11 having terminals 12, and the other power supply terminal (the − terminal in the diagram) is connected to a series of tabs 20 located on said strips 13 (or else adjacent to each terminal 14 in the FIG. 2 embodiment). Each module 16 includes a relay member 21 which is advantageously electronic (i.e. including an optocoupler or equivalent), which is connected to the tab 20 and to a tab 22 which is also present on each strip 13 (or else adjacent to each terminal 14 in the FIG. 2 embodiment). A power circuit switching component 23 is galvanically isolated from the control circuit to which the relay member belongs and may perform various functions (remote ON/OFF, remote dimming, timing, etc.). Said switching component 23 is protected by a temperature protection component 24 and is connected to a live input tab 25, to a controlled live output tab 26, and optionally to a neutral tab 27.

FIG. 4 is a perspective view of a particular embodiment of the switch block 5. The block includes a radiator 55 which is shown with one box 9 and five modules 16 fixed thereto. Each of these removable members includes fixing lugs 56 and 57. The fixing lug 56 is inserted into a groove 58 in the radiator 5, and the fixing lug 57 is screwed onto a shoulder 55 of the radiator. Each of the modules 16 shown in this figure includes one terminal 20 for the control circuit and a neutral terminal 59 which is used solely for controlling the power relay.

The two circuits constituting the electrical network of a building are connected to the various items mounted on the grooved wall bar 1, as follows. The power circuit is fed from a set of terminals 2 which are connected to mains (live wire 29; neutral wire 30; ground wire 28, connected to the ground terminal 4). One of the terminals 2 is connected to the terminal of the box 9 for supplying power to the control circuit. Other terminals 2 are connected to respective inlet/outlet terminals 15 in respective modules 16. Each terminal 15 thus has two wires 31 and 32 coming from each terminal 2. Two other wires 33 and 34 leave each terminal 15 and are connected to a lamp 35 (or to an outlet) or to a plurality of lamps 36, 37 (or a plurality of outlets) which are intended to be powered simultaneously, or else to one or more electrical apparatuses (e.g. motors for driving doors or blinds, radiators, etc.). The term "loop" as applied to a power circuit designates a circuit comprising a pair of wires 33, 34 together with the corresponding load (lamps/outlets) powered thereby. The wires 31, 32, 33, and 34 which convey mains voltage are the subject of safety regulations concerning their gauge, the thickness of the insulation which covers them, and the nature of the path which they follow through the building.

In the control network of the embodiment shown in FIGS. 1 and 3, connections are made as follows. In each room of the building there are several control means 38, 39, 40 and 41 (pushbuttons, switches, other equivalent means, including a specific control means described below with reference to FIG. 2), and said control means are located in positions which appear, a priori to be the most convenient positions, taking into account the locations of the various lamps, outlets, and controlled electrical apparatuses. In FIGS. 1 and 3, three control means 38, 39, and 40 are shown wired to control a single lamp 35, and a single control means 41 is shown wired to control two lamps 36 and 37 which are connected in parallel. A pair of wires 42, 43 is run from each control means to the distribution frame. These pairs of wires constituting the control circuit convey low voltage provided by the isolating transformer 18 and may therefore be of small gauge (e.g. of the type used for telephone installations). They thus have the advantages of being relatively cheap, compact, and substantially unrestricted in the paths which they may follow through the building (unlike wires conveying mains voltage). They are therefore easily moved should circumstances change. When it is desirable to combine pairs of wires before they reach the distribution frame (in one of the rooms of the building for example), a universal interconnection terminal strip may be used, and advantageously it should have wire-stripping means for receiving the wires. At the distribution frame, the pairs of wires 42, 43 are advantageously directly connected to the terminals of a terminal strip 6 (which terminals are advantageously suitable for stripping wires inserted therein). The terminal strip 6 may be a mere electrical connection point, or it may include means for processing control signals in a manner described below. (A priori, if the strip 6 is a mere connection point, each pair of wires 42, 43 could be directly connected to the terminals of a switch block 5; the wire 42 would be connected to the terminal 12 and the wire 43 to the terminal 14. However, the use of terminal strips 6 between the pairs of wires 42, 43 and the switch blocks 5 provides a much greater degree of flexibility in use). The wires 42 are connected to terminals 47 which are commoned on the strip 6, and said commoned terminals are connected by a wire 44 to a terminal 12 of a block 11. The wires 43 are connected to terminals 45 which belong to the same terminal strip but which are independent from one another, and each terminal 45 is also connected to a wire 46 known as a "jumper". (The term "loop" when applied to a control circuit refers to a circuit comprising control means, a pair of wires 42, 43, and the wires 44 and 46 which are respectively connected thereto). The other end of each jumper 46 is connected to a terminal 14 of the block 13 corresponding to the inlet/outlet terminal 15 of the power circuit which feeds the lamp, the outlet or the controlled apparatus which is to be controlled by the control means connected to said jumper. By way of example, in FIG. 1, jumpers 461, 462, and 463 are connected at one end to three terminals of a single terminal strip 6, which terminals are connected to the three control means 38, 39, and 40. The other ends of said jumpers are connected to three terminals 14 of the block 132 which corresponds to the inlet/outlet terminal 152 by which the lamp 35 is controlled by the control means 38, 39 and 40. The jumpers 46 must be easily connectable to the terminals 14 so that when it turns out, after the electric wiring has been installed, that such and such an control means is better placed to control such and such a lamp or outlet other than the one to which it was initially attributed, the corresponding jumper can almost instantly be disconnected from controlling the "wrong" power circuit and reconnected to a terminal in a new block 13. To this end, the terminals 14 in the blocks 13 are advantageously provided with wire-stripping contacts. A circuit in accordance with the invention is thus capable of being modified very easily.

The control network of the embodiment shown in FIG. 2 differs from that shown in FIG. 1 in that it includes one or more terminal strips 71 comprising a plurality of independent blocks of terminals 72 in addition to the terminal strips 6. The terminals 72 advantageously include wire-stripping contacts. The panel 8 of the switching block 5 is consequently modified and includes only one terminal 14 on each module 16 for connection to a jumper 460 (whereas in the FIG. 1 embodiment the panel 8 has a block 13 of several terminals 14 on each module 16 for connection, where necessary, to a plurality of jumpers 46). The pairs of wires 42, 43 are connected to the terminals 47, 45 on the terminal strips 6 in the same manner as described with reference to FIG. 1. However, the terminals 45 are no longer directly connected to the terminals 14 in a block 13 of the panel 8, but instead they are connected to the terminals 72 in a block of a terminal strip 71. Thus, in this embodiment different control loops for controlling a common power circuit loop are brought together on the terminal strips 71 rather than on the panel 8. For example, the three wires 43 from the three control means 38, 39, and 40 are connected to three terminals 45 on a terminal strip 6. These three terminals 45 are also connected by means of three jumpers 464, 465, and 466 to three terminals 72 all belonging to the same block in a terminal strip 71. A further terminal 72 of the same block is then connected to one end of a jumper 460 whose other end is connected to the sole terminal 14 corresponding to the power inlet/outlet terminal 152 of the power loop to be controlled by the control means 38, 39, and 40. As can clearly be seen in the figure, this embodiment of the invention greatly simplifies the connections between the switching block 5 and the terminal strips.

In addition to the terminal strips 6 and 71 shown in FIG. 2, there is a terminal strip 61 which includes electronic means for processing control signals. This strip 61 may constitute an alarm strip or a strip including a receiver/decoder for infrared remote control, for example. If there is an alarm network, the or each control circuit loop in the alarm network includes sensors 62 (window contacts, photocells, volume surveillance radars, etc;), and each power circuit loop in the alarm network includes various apparatuses such as alarm sirens, door-locking means, etc. In an infrared remote control network, each control circuit loop in the remote control network includes an infrared preamplifier 62 suitably located to respond to control signals from a portable controller, and each power circuit loop in the infrared control network includes any suitable type of lamp or electrical apparatus. Naturally this type of terminal strip is equally applicable to the FIG. 1 embodiment. In either case, the electronic terminal strip 61 is connected in exactly the same way as a conventional terminal strip 6.

Advantageously, in order to constitute the control circuit loops, cables are provided having a number of pairs of wires equal to the number of pairs of terminals in the terminal strips 6 and 7, with said terminals and said wires being individually identifiable by matching color coding. This makes it considerably easier to attribute pairs of wires to the distribution frame and to perform the bulk of the wiring in a systematic way which avoids the need for a special wiring plan.

The modules 16 serve to transmit the control signals derived from various points of the control circuits to the controlled lamps, outlets and other electrical apparatuses situated on the power circuits. Each of these modules performs a single switching function (remote ON/OFF, remote dimming, timing, etc.). Since these modules are removable, it is very easy to change the nature of the switching performed between an control means and the item which it controls. However, in some special applications, universal modules may be provided capable of performing a plurality of programmable functions.

A distribution frame of the type shown in FIGS. 1 or 2 may be installed on each floor of a building or in each appartment on a floor.

Since it may happen that there is a need to be able to control a lamp, or other apparatus or outlet connected to one distribution frame from an control means connected to another distribution frame, each distribution frame is provided with terminal strips 7 for relaying connections between distribution frames. For example, a pair of wires 48, 49 running from an control means 52 to the FIG. 1 distribution frame is connected to two terminals of a terminal strip 7. Two wires 50 and 51 connected to two terminals of the same terminal strip connected to the above terminals, are wired to a terminal strip 6 in another distribution frame (not shown) where they are connected in the manner already described.

Equipping a building with an electrical network comprising two circuits, namely a power circuit and a low voltage control circuit, with said circuits being interconnected as described above, has numerous advantages:

the control circuit is galvanically isolated from the mains. In addition, the use of a low voltage in the control circuit (where the bulk of human intervention is to be expected) provides greater safety;

the control circuit may be wired in any way which is convenient, thereby enabling numerous modifications to be made to the control circuit, given that it uses small gauge wires which are cheap and which are operated at low voltage;

there is no need to modify the installation merely to change the specific power circuits controlled by a given control circuit, the only changes required are changes to the jumpers 461, 462, 463 connecting the terminal strips 6 to the terminals 13 (or the jumpers 460, 464, 465, and 466 connecting the terminal strips 6 to a terminal 14 via a terminal strip 71), and maybe also to the switch block modules, where each module 16 is removable and may be swapped for another module providing some other form of switching;

the power switching modules may be electronic and thus totally silent;

the control means (pushbuttons) may be completely silent and they may be brought together to constitute very flat control panels; and control signals brought together at a highly compact assembly (the distribution frame) may be connected to other assemblies of the same type situated elsewhere in the same building.

The present invention is not limited to the specific embodiments described above, and numerous variations lying within the scope of the claims will occur to the person skilled in the art.

We claim:

1. A centralized switching circuit for an electrical network in a building, said switching circuit comprising:
   (a) a power circuit including at least one loop (31–34) connected to a source of electricity (2), and to at least one lamp (35) or other electrically-operated apparatus; and
   (b) a low-voltage circuit for controlling said power circuit and comprising at least one loop (42,43,44,46) connected to at least one control means (38) or sensor;
   (c) said power circuit and low voltage circuit being interconnected by a centralized switching member; and
   (d) said centralized switching member comprising a switching block (5) including at least two control circuit feed terminals (12,14) for connection to said control circuit loop, at least one inlet/outlet terminal (25,26) for connection to said power circuit loop, and at least one removable and interchangeable switching module (16) for establishing communication between said control circuit loop and said power circuit loop.

2. A centralized switching circuit according to claim 1, wherein the switching module includes a relay member (21).

3. A centralized switching circuit according to claim 2, wherein said relay member includes an opto-coupler.

4. A centralized switching circuit according to claim 2, wherein the switching module includes an ON/OFF switch.

5. A centralized switching circuit according to claim 2, wherein the switching module includes a remote dimmer.

6. A centralized switching circuit according to claim 2, wherein the switching module includes a timer.

7. A centralized switching circuit according to claim 1, wherein the switching block includes a power supply box (9) for the control circuit.

8. A centralized switching circuit according to claim 1, comprising at least one terminal strip (6) having two series of terminals, the terminals (47) of a first one of said series being interconnected, and the terminals (45) of a second one of said series being independent, one end of each control loop being connected to one of the terminals in said first series and the other end of each control loop being connected to a terminal in said second series, said first series of terminals being connected to a first control circuit feed terminal (12), and each terminal in said second series which is connected to said other end of one of said control circuit loops being also connected to one end of a jumper (46) whose other end is connected to a second control circuit feed terminal (14).

9. A centralized switching circuit according to claim 1, including at least two terminals strips (6,71), one of said strips (71) comprising a plurality of independent blocks of interconnected terminals (72), and the other of said strips (6) comprising two series of terminals, the terminals (47) of a first one of said series being interconnected and the terminals (45) of a second one of said series being independent, one end of each control loop being connected to one of said terminals in said first series and the other end of each control loop being connected to one of said terminals in said second series, said first series of terminals being connected to a first control circuit feed terminal (12), and each of said second series terminals which is connected to one end of a control circuit loop being also connected to one end of a jumper (464) whose other end is connected to one terminal of block of said first-mentioned terminal strip, said block being connected to a second control circuit feed terminal (14) by means of another jumper (460).

10. A centralized switching circuit according to claim 8 or 9, including at least one terminal strip (61) which includes electronic means for processing control signals.

11. A centralized switching circuit according to claim 10, wherein said electronic means for processing control signals include a receiver/decoder for infrared signals.

12. A centralized switching circuit according to claim 1, wherein each control circuit loop includes small gauge cables having pairs of wires of the type used for telephone installations, and wherein the number of pairs of wires in each cable corresponds to the number of pairs of terminals in each terminal strip, with corresponding wires and terminals being individually marked by matching color codes.

13. A centralized switching circuit according to claim 8, wherein the second feed terminal of the control circuit includes wire-stripping contacts.

14. A centralized switching circuit according to claim 1, wherein the first feed terminal of the control circuit includes wire-stripping contacts.

15. A centralized switching circuit according to claim 9, wherein the terminals of the terminal strips include wirestripping contacts.

* * * * *